United States Patent [19]

Berg

[11] 4,323,727
[45] Apr. 6, 1982

[54] CABLE STRAIN RELIEF AND SEALING APPARATUS

[75] Inventor: Arthur H. Berg, Fabius, N.Y.

[73] Assignee: Crouse-Hinds Company, Syracuse, N.Y.

[21] Appl. No.: 199,342

[22] Filed: Oct. 21, 1980

[51] Int. Cl.³ .................. H02G 3/22; F16J 15/10; H01R 13/58
[52] U.S. Cl. .................. 174/135; 174/65 SS; 277/115; 277/122; 277/124; 277/125
[58] Field of Search .................. 174/65 SS, 135; 277/102, 110, 112, 115, 117–125, 190, 191, 197; 285/249, 323, 341, 343, 385, 389, 393; 339/103 R

[56] References Cited

U.S. PATENT DOCUMENTS

| 987,296 | 3/1911 | Hahn | 277/118 X |
| 1,714,590 | 5/1929 | Dake | 174/65 SS X |
| 2,170,393 | 8/1939 | Tornblom | 174/65 SS X |

FOREIGN PATENT DOCUMENTS 2532666 2/1977 Fed. Rep. of Germany ... 174/65 SS

*Primary Examiner*—Laramie E. Askin
*Attorney, Agent, or Firm*—Jacobi, Siegel, Presta, Marzullo & Aronson

[57] ABSTRACT

Cable strain relief and sealing apparatus comprising a sleeve formed of flexible and resilient material having a substantially cylindrical inner surface and a tapered outer surface. The sleeve may be tapered inwardly from the mid-portion thereof to both end portions thereof or, alternatively, may be provided with a taper in one direction only. A plurality of oppositely extending axial slots are formed in the sleeve so that, upon radial inward compression of the sleeve by a housing member or the like enclosing the sleeve, the internal surface of the sleeve will tightly grip a cable passing therethrough. A sealing bushing formed of flexible and resilient material may be provided at each tapered end of the sleeve, and may have a taper that is substantially the same as that of the sleeve. Each bushing comprises an annular flange which extends within the adjacent end of the sleeve so that a tight sealing engagement between the sleeve, bushing and the cable is effected upon compression of the sleeve and the bushing by the surrounding housing members.

11 Claims, 12 Drawing Figures

CABLE STRAIN RELIEF AND SEALING APPARATUS

BACKGROUND OF THE INVENTION

The present invention relates to cable strain relief and sealing apparatus and, more particularly, to such apparatus formed of flexible and resilient material which can be easily compressed into tight, sealing engagement with a cable passing therethrough.

Heretofore, many different types of cable strain relief and sealing devices have been used. Although such devices have generally served their intended purpose, many of them have not been completely satisfactory for one or more of the following reasons:

1. They have been formed of permanently deformable materials, such as lead, so that they have not been able to conform completely to the enclosed cable after movement or stress thereof; and/or
2. They have been formed of materials or have been of a construction such that they do not adequately relieve cable strain or provide an adequate seal around the enclosed cable; and/or
3. Their construction has prevented tight or uniform gripping of the enclosed cable; and/or
4. They have caused cable damage; and/or
5. They have been complicated in construction and thus difficult and expensive to manufacture.

The cable strain relief and sealing apparatus of the present invention represents an improvement over similar apparatus that has been previously used and is not subject to any of the above-mentioned disadvantages.

SUMMARY OF THE INVENTION

The cable strain relief and sealing apparatus of the present invention comprises a sleeve formed of flexible and resilient material having a substantially cylindrical inner surface and a tapered outer surface. The sleeve may be tapered inwardly from the mid-portion thereof to both end portions thereof or, alternatively, may be provided with a taper in one direction only. A plurality of oppositely extending axial slots are formed in the sleeve to define hinged, cantilevered sections alternately extending from opposite ends thereof. Upon radial inward compression of the sleeve by a housing member or the like enclosing the sleeve, the internal surface of the sleeve will tightly grip a cable passing therethrough.

A sealing bushing formed of flexible and resilient material may be provided at each tapered end of the sleeve, and may have a taper that is substantially the same as that of the sleeve. Each bushing comprises an annular flange which extends within the adjacent end of the sleeve so that a tight sealing engagement between the sleeve, bushing and the cable is effected upon compression of the sleeve and the bushing by the surrounding housing members.

The inner surface of the sleeve may be suitably relieved to provide single or multiple gripping surfaces for better cable retention. When radial compressive forces are applied to the hinged cantilevered sections of the sleeve defined by the oppositely extending axial slots therein, the sections flex in a manner whereby the inner surface of the sleeve is caused to constrict evenly to thereby grip a cable passing therethrough. The relative force required to cause the flexing of the cantilevered sections is controlled by the length of the individual slots, the number and shape of the cantilevered sections and by the thickness of these sections.

Preferably, each sealing bushing is formed with suitable steps and shoulders adapted to fit within the adjacent recessed end of the cable strain relief sleeve to the extent that the outside profile of the strain relief sleeve continues substantially in line without any steps with the tapered outside profile of the adjacent sealing bushing or bushings.

DESCRIPTION OF THE PREFERRED EMBODIMENTS

Figure 1:
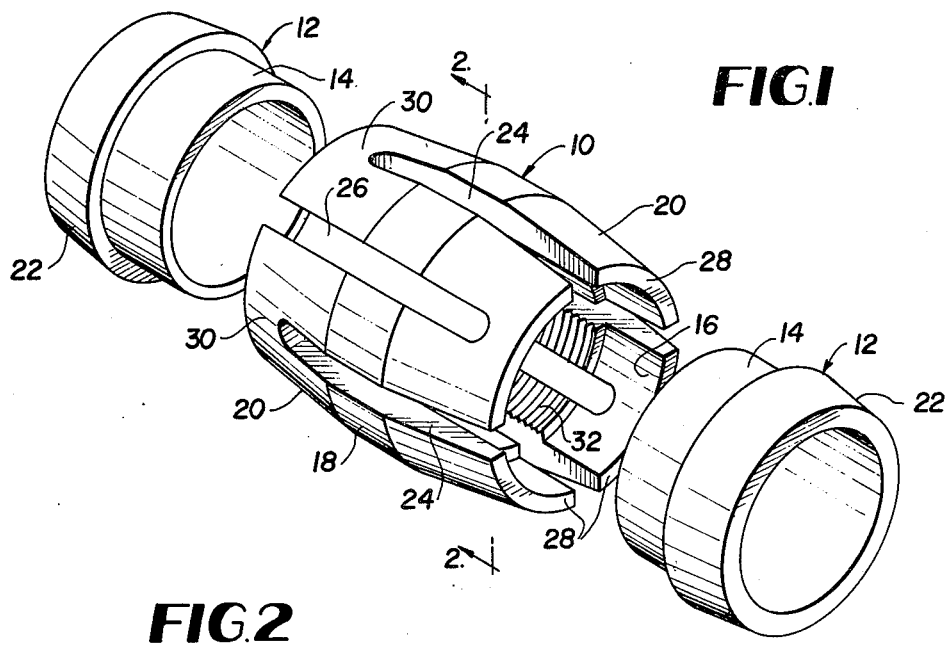
FIG. 1 is an exploded, perspective view of a cable strain relief and sealing apparatus constructed in accordance with the principles of the present invention.
Figure 2:
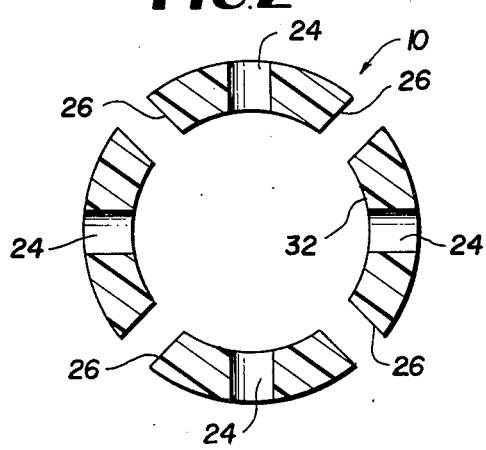
FIG. 2 is a sectional view taken substantially along line 2—2 in FIG. 1.
Figure 3:
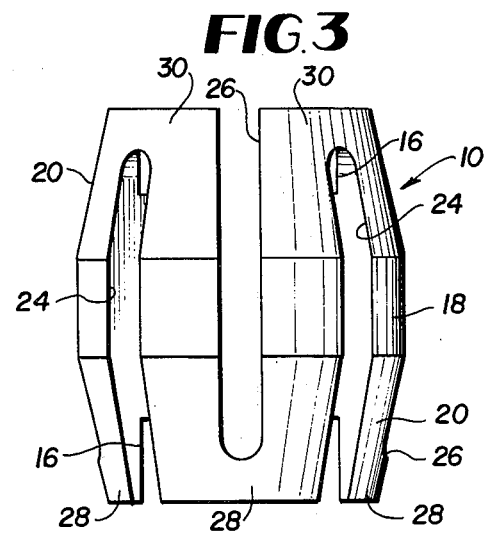
FIG. 3 is a side elevational view of the cable strain relief sleeve forming part of the apparatus shown in FIG. 1.

The apparatus of the present invention generally comprises a cable strain relief sleeve 10, which may be of the type shown in FIGS. 1–4, and may also comprise one or more sealing bushings 12 of the type shown in FIGS. 1, and 10–12. Preferably, each sealing bushing 12 is provided with a recessed, inwardly extending, annular flange 14 which is adapted to be slidably received within the adjacent recessed end portion 16 of the sleeve 10 in the manner shown in FIG. 4.

In accordance with a first embodiment of the apparatus of the present invention, as shown in FIGS. 1–4, the sleeve 10 comprises a generally cylindrical center section 18 and end sections having tapered outer surfaces 20. Each sealing bushing 12 may also be provided with a tapered outer surface 22 on its outer end portion that is complementary with and forms an extension of the adjacent tapered outer surface 20 of the sleeve 10 in the manner shown in FIG. 4.

The cable strain relief sleeve 10 further comprises a plurality of axial slots 24, 26 therethrough, alternately extending from opposite ends thereof. In the illustrative example shown in FIGS. 1–3, four axial slots 24 extend from one end of the sleeve 10 and four axial slots 26 extend from the other end of the sleeve. The axial slots 24, 26 serve to define four hinged, cantilevered sections 28 having their free ends at one end of the sleeve 10, and four hinged, cantilevered sections 30 having their free ends at the opposite end of the sleeve.

The substantially cylindrical inner surface 32 of the sleeve preferably is suitably relieved, e.g., knurled or roughened or the like, as shown in FIG. 1, for the purpose of providing for better gripping of a cable extending therethrough.

Preferably, the strain relief sleeve 10 and the sealing bushings 12 are formed of a suitable flexible and resilient material, such as nylon, polypropylene, polyvinyl chloride or other suitable material. The advantage of using a moldable plastic material is that both the sleeve 10 and the bushings 12 can be easily and cheaply manufactured in a simple molding operation.

Figure 4:
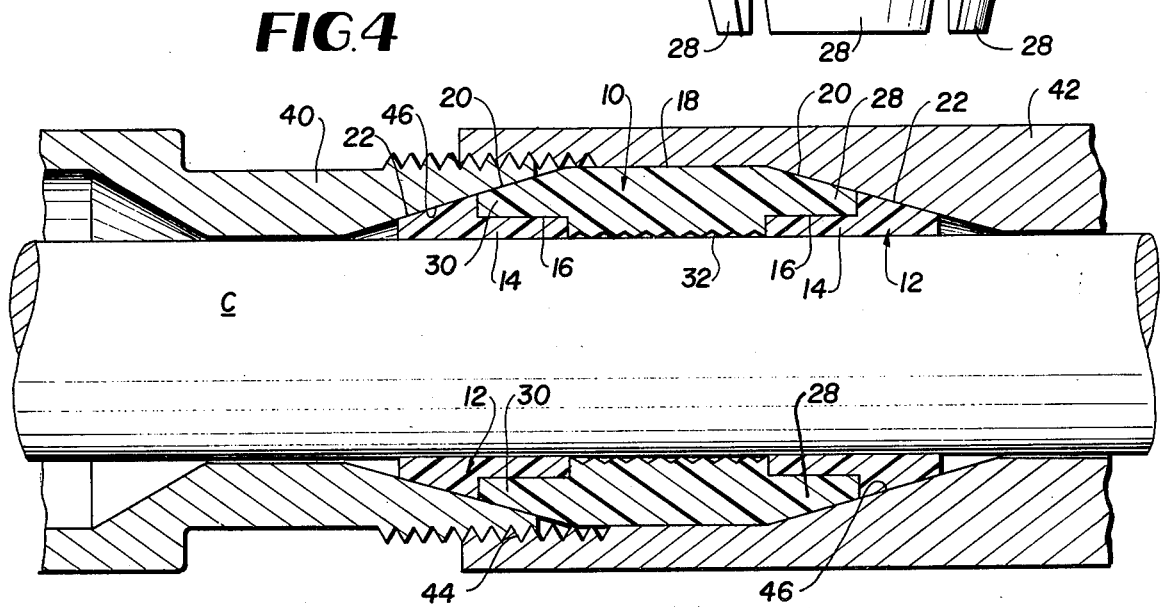
FIG. 4 is a side elevational view in section of the cable strain relief sealing apparatus in assembled form, with a cable extending therethrough and surrounding housing members.

In the use of the apparatus of the present invention, as shown in FIG. 4, a cable C is passed through the interior of the strain relief sleeve 10 and sealing bushings 12 which have their inner flange portions 14 inserted within the adjacent recessed portions 16 in the ends of the sleeve 10. Housing members 40 and 42 that are adjustably assembled by threads 44 or other suitable means surround the sleeve 10 and bushings 12, and are provided with tapered inner surfaces 46 that are complementary with and in engagement with the tapered outer surfaces 20 and 22 of the sleeve 10 and bushings 12, respectively. As the housing members 40 and 42 are threaded more closely together, their tapered inner surfaces 46 serve to compress both the sleeve 10 and bushings 12, and to flex inwardly the cantilevered sections 28, 30, to uniformly constrict the inner surface 32 of the sleeve into tight engagement with the exterior surface of the cable C and the inner surfaces of the bushings 12 into tight sealing engagement with the adjacent exterior surfaces of the cable C. In this manner, the cable C is tightly gripped by the strain relief sleeve 10 and is sealingly engaged by the sealing bushings 12 within the housing 40, 42.

It is noted that the cable strain relief sleeve 10 may be used without the bushings 12. In such a case, the sleeve 10 would not be provided with the recessed end portions 16.

Figure 5:
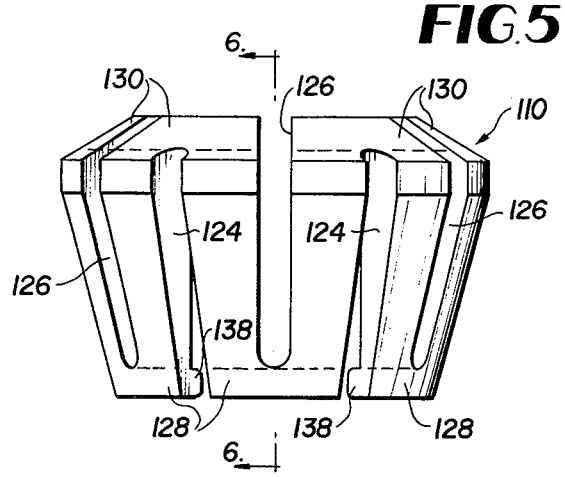
FIG. 5 is a side elevational view of a second embodiment of a strain relief sleeve of the present apparatus.
Figure 6:
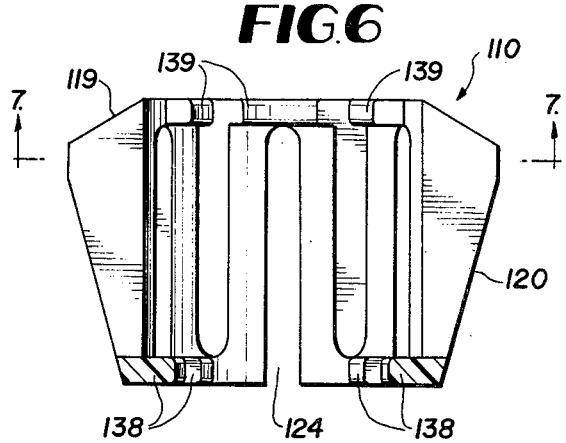
FIG. 6 is a sectional view taken substantially along line 6—6 of FIG. 5.
Figure 7:
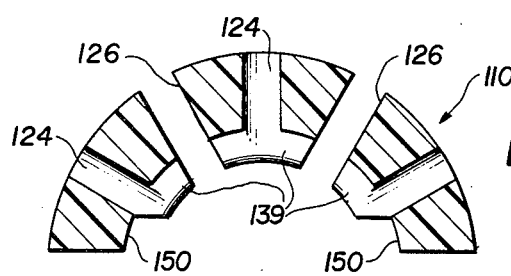
FIG. 7 is a sectional view taken substantially along line 7—7 in FIG. 6.
Figure 8:
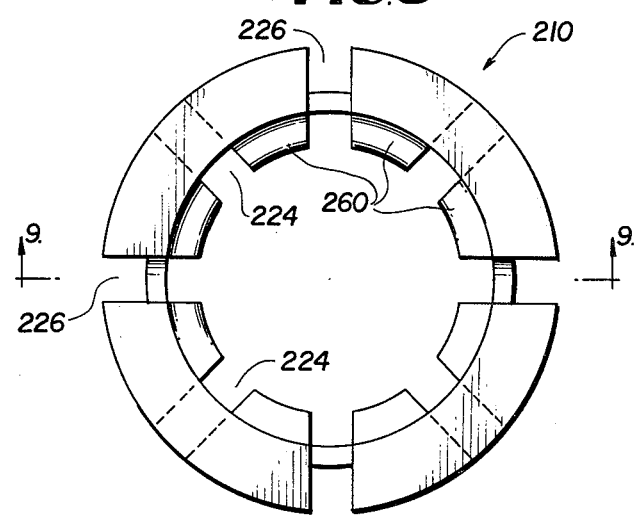
FIG. 8 is an end view of a third embodiment of a strain relief sleeve of the present apparatus.
Figure 9:
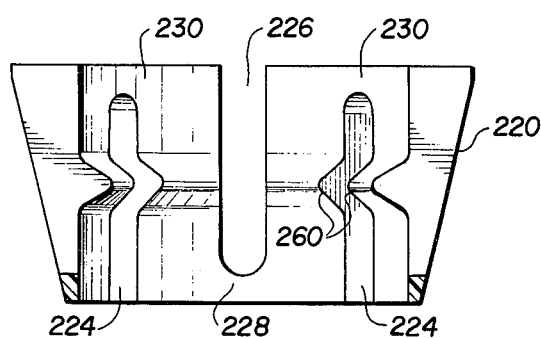
FIG. 9 is a sectional view taken substantially along line 9—9 of FIG. 8.

It is further noted that the strain relief sleeve 10 may be provided with an outer tapered surface extending only to one end thereof, in the manner shown in FIGS. 8 and 9, instead of the double outside tapered surfaces shown in FIGS. 1–4. In the second embodiment shown in FIGS. 5–7, the sleeve 110 is provided with a very short tapered portion 119 at one end and an elongated tapered outer surface 120 extending to the opposite end thereof. The sleeve 110 comprises alternating elongated slots 124, 126 and cantilevered sections 128, 130 like those shown in the first embodiment illustrated in FIGS. 1–3 of the drawings. The ends of the cantilevered sections 128, 130 are provided with inwardly extending tab portions 138, 139, respectively, for the purpose of providing a better grip on a cable extending through the sleeve 110 when it is compressed within a housing or the like enclosing it. For the purpose of providing different gripping of the cable C along the length of the sleeve 110, its inner surface may be relieved at different points along its length, such as the recessed portions 150 shown in FIG. 7.

A third embodiment of the cable strain relief sleeve 210 is shown in FIGS. 8 and 9. The sleeve 210 comprises a single outer tapered surface 220 and alternating, oppositely extending slots 224, 226 which define hinged, cantilevered sections 228, 230 in the same manner as the first and second embodiments previously described. For the purpose of providing better retention of a cable extending therethrough, the sleeve 210 comprises inwardly extending, annular gripping portions 260 near the mid-portion thereof which extend through all of the cantilevered or hinged sections. When the sleeve 210 is compressed by a housing or other member surrounding it, the inwardly extending annular portions 260 are pressed into tight engagement with the adjacent outer surface of the cable extending therethrough.

In accordance with the principles of the present invention, the inner surface of the cable strain relief sleeve may be formed in any suitable manner to provide better cable retention other than those specifically disclosed herein.

Figure 10:
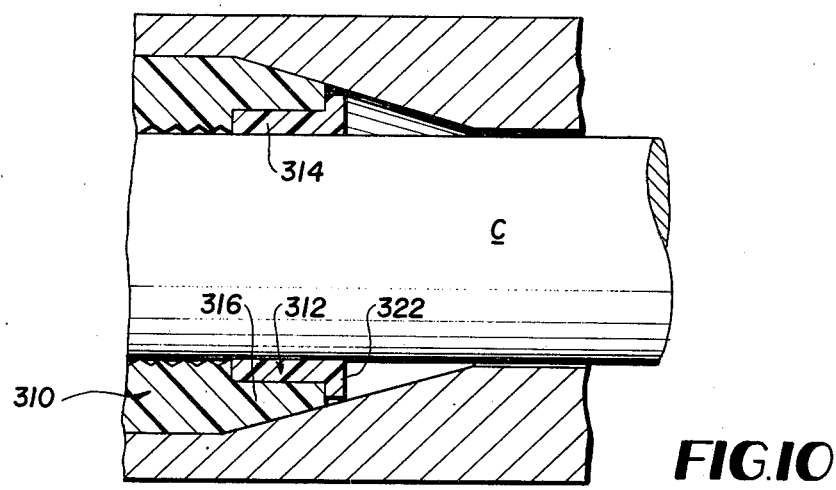
FIG. 10 is a side elevational view, partially in section, of the cable strain relief sealing apparatus of the present invention, with a second embodiment of the sealing bushing.
Figure 11:
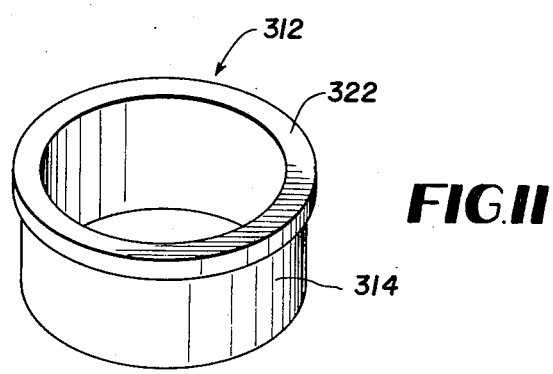
FIG. 11 is a perspective view of the sealing bushing shown in FIG. 10.

FIGS. 10 and 11 show a further embodiment of the apparatus of the present invention wherein a modified form of sealing bushing 312 is utilized. The sealing bushing of FIGS. 10 and 11 comprises an annular flange 314 which is adapted to be slidably received within the adjacent recessed end portion 316 of the sleeve 310. The annular body portion 322 of the sealing bushing is adapted to engage the adjacent end of the sleeve 310 when the flange 314 is received within the recessed end portion 316 of the sleeve 310, as shown in FIG. 10.

Figure 12:
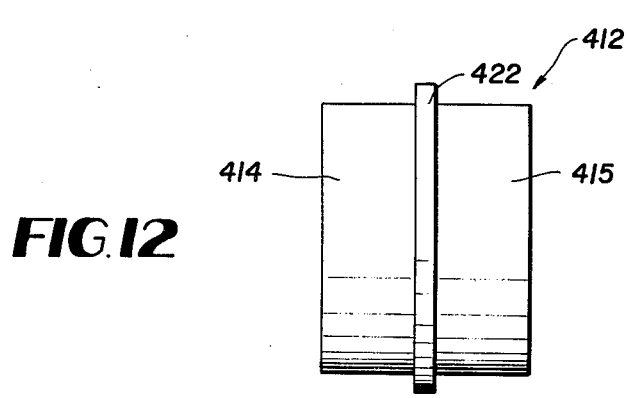
FIG. 12 is a side elevational view of a third embodiment of the sealing bushing of the present apparatus.

Referring to FIG. 12, a further embodiment of a sealing bushing 412 comprises an annular body portion 422 and a pair of annular flange portions 414, 415 extending oppositely from the body portion 422 and adapted to be slidably received within the recessed end portions of adjacent sleeves.

What is claimed is:

1. Cable strain relief and sealing apparatus, comprising:
   a sleeve formed of flexible and resilient material, said sleeve having an outer surface tapered inwardly toward one end thereof,
   said sleeve comprising a plurality of substantially axial slots alternately extending from opposite ends thereof to define a plurality of cantilevered sections alternately extending from opposite ends thereof,
   whereby an inward force on said tapered outer surface causes said cantilevered sections to flex inwardly so that the inner surface of said sleeve constricts to grip a cable when passing therethrough, and
   a sealing bushing of flexible and resilient material mating with one end of said sleeve,
   said one end of said sleeve having an annular recessed portion, and said bushing having an annular flange portion that is slidably received within said recessed portion.

2. The cable strain relief and sealing apparatus of claim 1 wherein the outer surface of said sleeve is tapered inwardly from the mid-portion toward both ends thereof.

3. The cable strain relief and sealing apparatus of claim 2 wherein said mid-portion is substantially cylindrical in shape.

4. The cable strain relief and sealing apparatus of claim 1 wherein the inner surface of said sleeve is relieved to improve gripping of a cable when passing therethrough.

5. The cable strain relief and sealing apparatus of claim 4 wherein said inner surface in knurled.

6. The cable strain relief and sealing apparatus of claim 4 wherein said inner surface is relieved at different points along the axial length thereof.

7. The cable strain relief and sealing apparatus of claim 1 wherein said inner surface of said sleeve is provided with an inwardly extending, annular gripping portion.

8. The cable strain relief and sealing apparatus of claim 1 wherein said bushing has an outer surface with a taper that is complimentary with and forms an extension of said outer tapered surface of said sleeve, and said bushing has an inner surface in substantial alignment with said inner sleeve surface.

9. The cable strain relief and sealing apparatus of claim 1 wherein said bushing comprises an annular body portion engaging the one end of said sleeve.

10. The cable strain relief and sealing apparatus of claim 9 wherein said bushing comprises a pair of annular flange portions extending in opposite directions from said annular body portion.

11. The cable strain relief and sealing apparatus of claim 1, further comprising sealing bushings of flexible and resilient material mating with each end of said sleeve, each bushing having an inner surface in substantial alignment with said inner sleeve surface.

* * * * *